United States Patent [19]
Doe

[11] 3,782,593
[45] Jan. 1, 1974

[54] BAR HOLDER ARRANGEMENT FOR AN AUTOMATIC MACHINE TOOL

[75] Inventor: Ewart H. Doe, Houghton, near Stockbridge, England

[73] Assignee: Twyford Moors (Aircraft & Engineering) Limited, Eastleigh, Hampshire, England

[22] Filed: July 20, 1971

[21] Appl. No.: 164,403

[30] Foreign Application Priority Data
July 30, 1970 Great Britain .................. 36,953/70
Oct. 22, 1970 Great Britain .................. 50,306/70

[52] U.S. Cl. .............................. 221/248, 221/293
[51] Int. Cl. .............................................. B65h 3/50
[58] Field of Search ................... 221/9, 239, 248, 221/289, 290, 293, 294, 249

[56] References Cited
UNITED STATES PATENTS

| | | | |
|---|---|---|---|
| 2,320,039 | 5/1943 | Jobert | 221/9 X |
| 2,781,574 | 2/1957 | Harvey | 221/293 |
| 1,498,476 | 6/1924 | Nadwocki | 221/248 |
| 3,170,559 | 2/1965 | Clements | 221/248 |
| 2,130,315 | 9/1938 | Brown | 221/248 |

Primary Examiner—Robert B. Reeves
Assistant Examiner—Thomas E. Kocovsky
Attorney—Neil F. Markva et al.

[57] ABSTRACT

A bar holder arrangement for holding bar stock material to be fed to an automatic machine tool. A slide presses a length of bar stock material from a magazine into a bar holder. A retaining member cooperates with the slide in a manner such that the retaining member does not move from a position in which it prevents movement of the length of bar stock material into the bar holder until the slide member has moved to a position in which movement of the next length of bar stock material in the magazine is prevented by the slide member thereby preventing double loading. The bar holder arrangement may include more than one bar holder in an indexable reel, means permitting the arrangement to be quickly reset to accommodate a change in diameter of the bar stock material being used, means for preventing indexing of the reel if a bar holder has not been closed and means for sensing whether or not bar stock material in a bar holder has been completely used up.

15 Claims, 8 Drawing Figures

BAR HOLDER ARRANGEMENT FOR AN AUTOMATIC MACHINE TOOL

BACKGROUND OF THE INVENTION

The invention relates to a bar holder arrangement for an automatic machine tool.

Bar holders have been proposed in which bar stock material, to be machined on an automatic machine tool, particularly an automatic lathe, can be held and can automatically be fed towards spindles of the machine tool by a bar feed in increments necessary to form new workpieces for machining on the machine tool.

SUMMARY OF THE INVENTION

According to the invention a bar holder arrangement for an automatic machine tool includes a magazine, an elongated bar holder and means for loading a length of bar stock material from the magazine into the elongated bar holder. The loading means comprises a slide member that is movable towards the bar holder to apply a force to a length of bar stock material in the magazine to insert it into the bar holder. A retaining member is movable between a first position in which it prevents movement of a length of bar stock material from the magazine to the bar holder and a second position in which it does not prevent such movement. The slide and retaining members are coupled to a common actuating means for operation in synchronism in a manner such that the retaining member is not moved into its second position until the slide member has moved into a position in which it obstructs movement into the bar holder from the magazine of the next length of bar stock material in the magazine.

When a bar holder arrangement is to be used with a multiple spindle machine tool, a plurality of such means are advantageously provided spaced apart longitudinally along a framework which supports for rotation an indexable reel in which a plurality of bar holders are mounted. A shaft is advantageously rotatably mounted in the framework and the piston of an air cylinder is coupled to an arm secured to the shaft so that operation of the air cylinder causes a partial rotation of the shaft. Further arms are secured to the shaft at intervals therealong and are connected by linkages to the slides to cause sliding movement thereof when the air cylidner is operated. The members are advantageously each provided on a respective bell crank. The bell cranks are pivoted on the framework of the machine and the outer end of one arm of each bell crank has a slot in which a pin engages, the pin extending from the respective slide so that sliding movement of the slide causes pivoting movement of the bell crank. The other arm of each bell crank at its outer end mounts a respective one of said members, each of said members advantageously projecting from the respective arm in a direction approximately parallel to said one arm of the respective bell crank. The end of each slide to engage the bar stock material is advantageously concavely curved to a radius which corresponds approximately to the radius of the bar stock material to be inserted into the bar holder.

Spring loaded members may be so disposed as to define between them, in said path of movement, a gap of lesser width than the diameter of the bar stock material to be inserted. Operation of the slide is effective to press said spring loaded retaining members apart to allow the bar stock material to enter the bar holder.

Where a plurality of bar holders are provided in an indexable reel in parallel relation one to another, each of the bar holders may be formed by two elongated members each of semi-circular section, one of the elongated members being secured to the indexable reel and the other of the elongated members being hingedly mounted to said one of the elongated members. A bar holder arrangement preferably includes a plurality of levers secured to said other of the elongated members, said levers mounting rollers for engagement with cam faces of operating levers mounted on the framework which supports the reel, whereby said other of the elongated members can be moved from a closed position to an open position, and springs secured between said levers and the reel to bias said other of the elongated members to a closed position.

A bar holder arrangement for an automatic multiple spindle lathe advantageously includes means to sense whether or not bar holders mounted in an indexable reel of the bar holder arrangement are in an open or a closed position, said means being effective, upon detecting an open bar holder, to prevent indexing movement of a spindle head of the automatic multiple spindle lathe, and thus indexing movement of the indexing reel, whereby risk of damage due to indexing the reel of the bar holder arrangement when a bar holder thereof is in an open position is avoided.

Desirably a bar holder arrangement is capable of holding bar stock material of any one of a plurality of diameters of bar ranging from quarter-inch diameter to one and three-quarter inch diameter and is readily changeable to feed a bar of a different diameter within this range.

Since the associated machine tools is "down," that is to say is unproductive, during the time that the bar holder arrangement is being changed over to enable it to feed a different size of bar stock, it is desirable that the changeover time be kept to a minimum.

Advantageously therefore the slide is adjustable in position both in the direction in which it is to apply said force and in a direction parallel to a surface of the magazine, on which surface bar stock material to be fed to the bar holder can be stored, and at least one guide means forming one side of a slot through which the bar stock material is to be fed to the bar holder, is adjustable in position to vary the width of said slot Advantageously, said guide means forms a front stop against which the next length of bar stock material to be inserted into the bar holder lies, the desired position of said guide being spaced a distance, measured in the horizontal direction, equal to half the diameter of the bar stock material being used away from a longitudinally extending vertical plane extending through the center line of the bar holder.

A further guide or second guide means which forms the other side of said slot, is also advantageously adjustable in position to vary the width of said slot.

The slide, the guide and the further guide are each advantageously clampingly secured to respective mounting members on which they are mounted and the slide, the guide and the further guide or the respective members on which they are mounted each carry a block gauge receiving means whereby by engaging in the block gauge receiving means a block gauge of an appropriate size to the diameter of the bar stock material being used and moving the slide, the guide and the further guide to positions at which the block gauge is a sliding fit between an end face of the slide, the guide and the further guide and the block gauge receiving means or, when the block gauge receiving means are mounted on the guide, the further guide and the slide, between the block gauge receiving means and surfaces of the respective members on which the slide, the guide and the further guide are mounted, the slide, the guide and the further guide can be readily moved to and secured in desired positions for a determined diameter of bar stock material to be used.

Where a plurality of bar holders are provided on an indexable reel of a bar holder arrangement, a bottom stop is advantageously provided on the reel for each of the plurality of the bar holders, each of said bottom stops being adjustable in position towards and away from the outer edge of the reel to a desired position in which a length of bar stock material dropped onto said bottom stop is at an equal radius from the center of the reel to the radius from the centre of the reel of the center line of the respective bar holder.

Preferably the bottom stop is formed by a member of plastics material forming an inner lower surface of a U-shaped member, the U-shaped member being adjustable in position with respect to a fixed member of the reel under the action of a screw-threaded member, projections being provided on said U-shaped member and said fixed member between which a block gauge of a thickness appropriate to the size of bar stock material to be used can be inserted, so that when said projections engage with a sliding fit opposite faces of the block gauge, the plastics member is at a desired position to support a length of bar stock material dropped thereonto, so that the length of bar stock material can be readily engaged in the bar holder and the bar holder can be closed.

A gauge for setting the slide, the guide and the further guide and the bottom stop to desired positions advantageously comprises a cylindrical handle portion, an extension of the cylindrical handle portion of smaller diameter to engage a slot in said gauge receiving means and a further extension which is screw threaded to receive a block gauge formed as a disc of accurately determined thickness. The other end of the cylindrical handle portion to the reduced diameter portion and the screw threaded portion is advantageously provided with a flange of greater diameter than the cylindrical handle portion, the thickness of the flange being equal to the desired spacing between the lower face of the slide and the upper face of the length of bar stock material in the magazine, whereby insertion of said flange beneath a lower face of said slide and adjustment of the slide so that the flange is a sliding fit between the slide and the length of bar stock material adjusts the slide to a desired position.

Thus, it can be seen that by unclamping the slide, the guide and the further guide and moving them to desired positions as set by the block gauge, means according to the invention for loading a length of bar stock material from a magazine into a bar holder can be readily readjusted to accommodate a change in size of bar stock material to be held in the bar holder.

A bar holder arrangement may also include means to indicate whether or not a bar holder thereof has a length of bar stock material therein, that is to say whether or not a length of bar stock material previously loaded into the bar holder has been exhausted. Such means may comprise a member mounted on a forward end frame member of the bar holder arrangement in a position in which it is engaged by a length of bar stock material projecting from the forward end of the bar holder as the indexable reel is indexed around. Change in diameter of bar stock material being used to a larger diameter of bar stock material may cause damage to the indicating means if the operator omits to reset the indicating means to a position spaced further outwardly from the center of the reel.

Indicating menas of the kind referred to be pivotally mounted on the frame of the bar holder arrangement and spring biased for movement about the pivot to a desired position, engagement by a length of bar stock material upon indexing of the reel being effective to move said indicating means by an amount sufficient to cause operation thereof and further movement of the indicating means beyond that necessary to cause operation of the indicating means being effective to move the indicating means about said pivot against the bias of the spring whereby damage to the indicating means is avoided.

The indicating menas advantageously comprises a roller to be engaged by the bar stock material, the roller being movable with respect to the remainder of the indicating means to operate a microswitch thereof, and adjusting means effective to adjust the position of said roller with respect to the center of the reel to position the roller at a distance from the center of the reel suitable for a diameter of bar stock material to be held in the bar holder.

BRIEF DESCRIPTION OF DRAWINGS

The invention is diagrammatically illustrated by way of example in the accompanying drawings, in which.

DESCRIPTION OF SPECIFIC EMBODIMENTS

Figure 1:
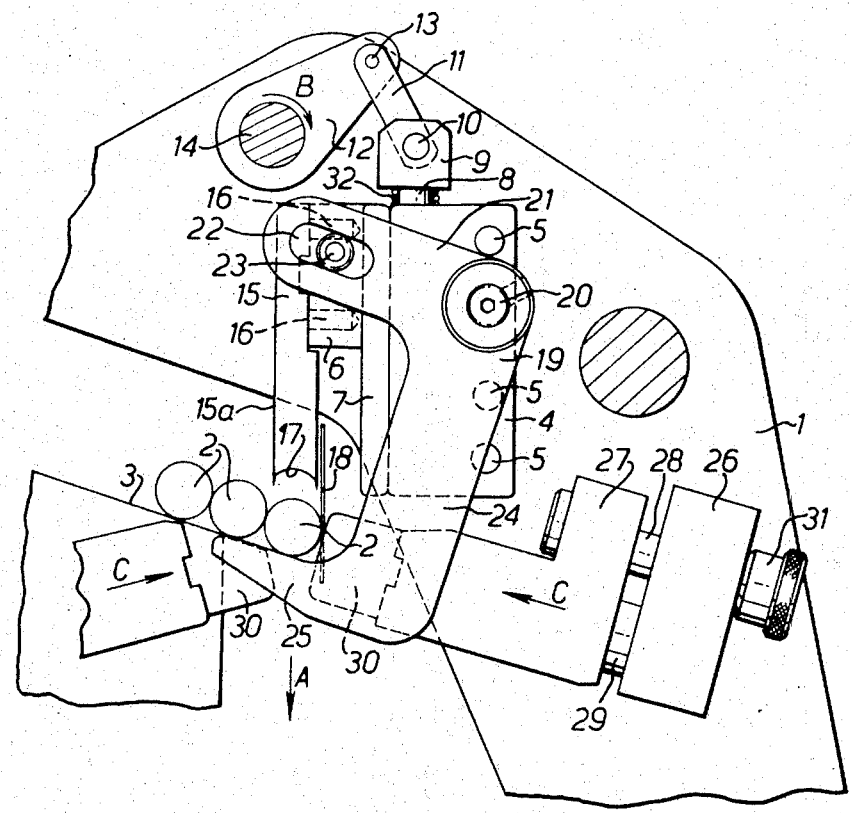
FIG. 1 is an elevation of one embodiment of means for loading a length of bar stock material into an elongated bar holder of a bar holder arrangement for a multi-spindle automatic lathe.

Referring to the drawings, FIG. 1 shows a frame member 1 which is one of a plurality of frame members mounting an indexable reel bearing a plurality of bar holders which are openable to permit a fresh length of bar stock material to be inserted thereinto.

Three lengths of bar stock material 2 are shown in a magazine formed by a cut-out in the frame member 1 having a lower surface 3. The bar stock material 2 is to be pressed in the direction of arrow A to enter an open bar holder (not shown) located below arrow A.

A mounting block 4 is secured to the frame member 1 by screws 5. A slidable block 6 is slidably mounted in a vertically extending recess in the mounting block 4 and is constrained for vertical movement only by means of front edge portions 7 of the mounting block 4. The slidable block 6 is secured to a stem 8 within the recess in the mounting block 4, the stem 8 having a head 9 with a transverse aperture therethrough, in which aperture a pin 10 is pivotably mounted. The pin 10 passes through an aperture in one end of a link 11 the other end of which is pivotably mounted to an arm 12 by means of a pin 13. The arm 12 is rigidly secured to a rotatable torsion bar 14 which extends through the frame member 1 and through other plates forming further frame members spaced along the bar holder arrangement, an arm (not shown) being secured to the torsion bar 14 and to an air operated piston cylinder arrangement (not shown) whereby the torsion bar 14 can be caused to effect a partial rotation in the direction of arrow B when compressed air is supplied to the piston cylinder arrangement. Partial rotation of the torsion bar 14 in the direction of arrow B is thus efective to move the arm 12 in the direction of arrow B and to cause the stem 8 and thus the slidable block 6 to effect a downward vertical movement (as shown in FIG. 1) with respect to the mounting block 4. A slide or slide member 15 is secured to the slidable block 6 by means of screws 16 and has a concave bottom face 17 to engage the upper face of the length of bar stock material 2 which is at an inner position in the magazine, that is to say lying against a face 18 of a stop (not shown).

A bell crank 19 is pivotally mounted on the mounting block 4 by means of a pivot pin 20, a first arm 21 of the bell crank 19 having a slot 22 therein. The slot 22 is of a width corresponding to the diameter of a roller 23 mounted on the slidable block 6. A second arm 24 of the bell crank 19 has a member retaining 25 projecting from the end thereof in a direction substantially parallel to the first arm 21. The retaining member 25, in the position shown, supports the length of bar stock material 2 which lies against face 18 of the stop.

When a fresh length of bar stock material 2 is required to be loaded into a bar holder, advantageously this requirement is sensed by a detector positioned between the bar holder arrangement and the multiple spindle lathe which it feeds, the bar holder positioned beneath the slide 15 is opened and the piston cylinder arrangement is operated by supplying compressed air thereto to cause the torsion bar 14 to effect a partial rotation in the direction of arrow B. Such rotation as explained above is effective to cause a vertically downward sliding movement of the slidable block 6 and thus the slide 15 to cause the concave end 17 of the slide 15 to engage the upper face of the length of bar stock material 2 lying against the face 18 of the stop. Such rotation is also effective, due to the roller 23 acting upon the inner walls of the slot 22 in the arm 21 of the bell crank 19, to cause the bell crank 19 to effect a counter-clockwise rotation about its mounting pin 20 to remove the retaining member 25 of the bell crank 19 from beneath the length of bar stock material lying against the face 1 of the stop.

The inter-action of the slide 15 and the bell crank 19 is such that the member 25 is not removed from beneath the length of bar stock material 2 lying against the face 18 of the stop until an outer face 15a of the slide 15 has been moved to a position in which it engages the righthand face (as shown in FIG. 1) of the length of the bar stock material 2 adjacent to the length of the bar stock material 2 lying against the face 18 of the stop, thereby to restrain said adjacent length of bar stock material 2 and remove the possibility of feeding more than one length of bar stock material to the bar holder. The position of the face 18 of the stop and the thickness of the slide 15 can be adjusted by unlocking and sliding the top to a different position and by replacing the slide 15 by a similar slide of different thickness.

Symmetrically disposed on either side of the slide 15 are mounting blocks 26, (only the righthand one of which is fully shown) secured to the plate 1. The mounting blocks 26 carry members 27 for sliding movement by means of rods 28 and 29 against the pressure of springs (not shown) which bias the members 27 respectively in the direction of arrows C. The members 27 each carry a respective end member 30, the spacing apart of which is variable by means of nuts 31 screw threadedly mounted on the rods 28 to vary the gaps between the mounting blocks 26 and the members 27.

As a length of bar stock material 2 is pressed downwardly in the direction of arrow A by the slide 15, after the retaining member 25 of the bell crank 19 has been removed from therebeneath, the members 27 are forced respectively in directions opposite to the directions of arrows C to permit the length of bar stock material 2 to be pressed between the end members 30 of the members 27.

When the slide 15 has effected a full downward stroke, the supply of air to the piston cylinder arrangement is removed and the apparatus shown in FIG. 1 is returned to the position shown in FIG. 1 by means of a coil spring 32 surrounding the stem 8 and acting against the underside of the head block 9 of the stem 8. Thus, before a further length of bar stock material 2 can move to a position beneath the slide 15, the retaining member 25 is engaged therebelow to prevent accidental double feeding.

Figure 2:
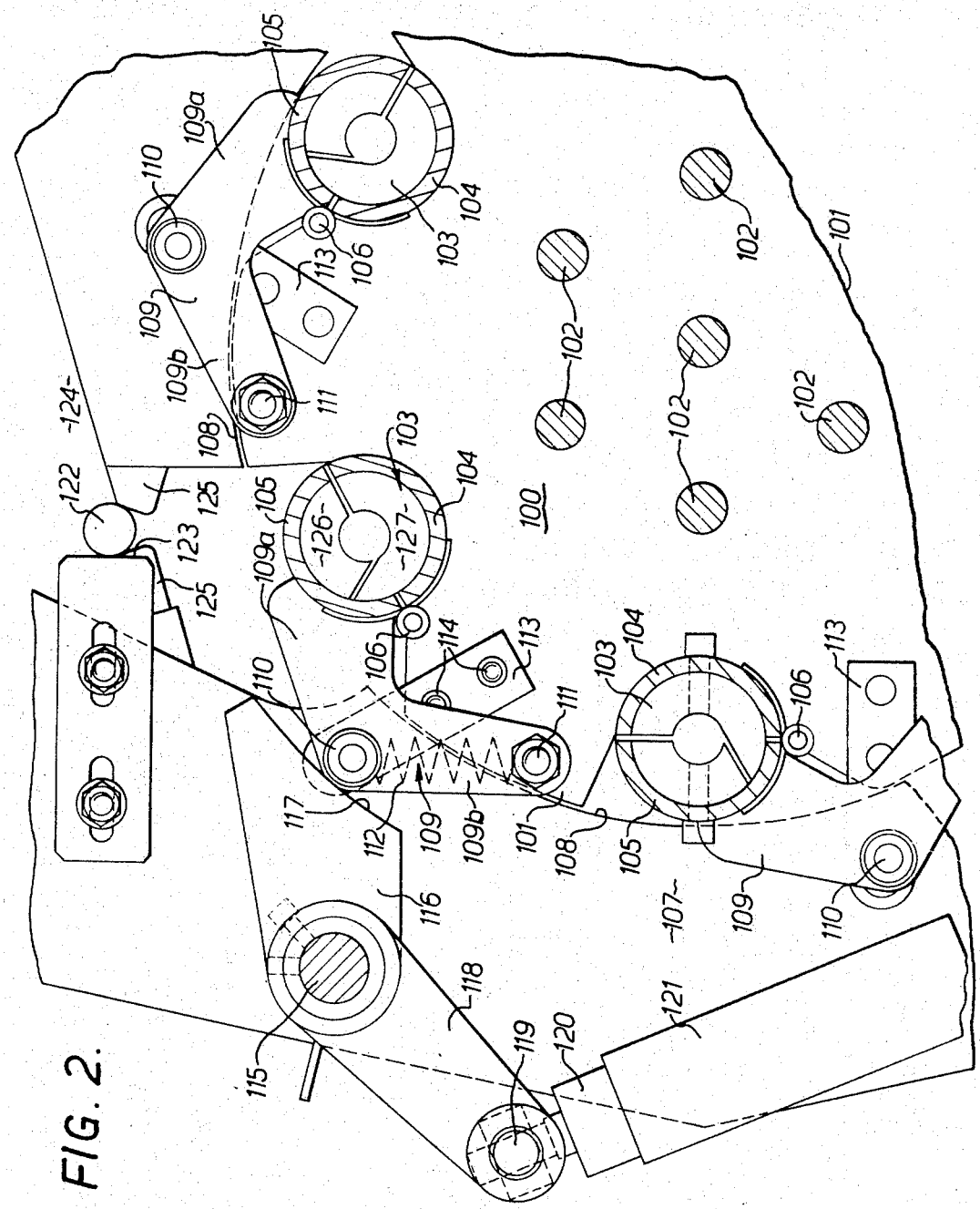
FIG. 2 is an elevation of means for opening an elongated bar holder of a bar holder arrangement for a multi-spindle automatic lathe.

Referring to FIG. 2, a reel 100 of a bar holder arrangement for an automatic multi-spindle lathe comprises a plurality of generally circular plates 101 secured in parallel relation by a plurality of longitudinally extending bars 102 and mounting a plurality, preferably six but only three of which are shown, bar holders 103 equally spaced around the periphery.

Each of the bar holders 103 compirses a fixed semi-cylindrical member 104 and a movable semi-cylindrical member 105 which is secured to the member 104 by a hinge 106.

The circular plates 101 are mounted for rotation in a framework formed by plates 107 each having an inner edge 108 defining a generally circular aperture in which a respective plate 101 can rotate. The reel 100 is secured to an indexing head of the multi-spindle lathe which it feeds and is indexed around with the indexing head.

Secured to each of the movable semi-cylindrical members 105 is a lever arm 109. The lever arms 109 are of angular form. That is, each comprises a first portion 109a secured to the movable member 105 and a second portion 109b approximately at right-angles to the member 109a.

At the junction of the members 109a and 109b a freely rotatable roller 110 is mounted. At the outer end of the arm 109b, a bolt 111 provides an anchorage for one end of a spring 112. The other end of spring 112 is secured to an anchorage provided on the outer end of an elongated plate 113 secured to the plate 101 by means of screws 114. The spring 112 thus acts on the lever arm 109 to bias the movable member 105 about the hinge 106 to the closed position shown.

A shaft 115 is rotatably mounted in the fixed plate 107 and has rigidly secured thereto arms 116. Each arm 116 has a cam face 117 positioned to lie against the respective roller 110 of one of the lever arms 109 as the various lever arms 109 are indexed around with the reel 100. An arm 118 is pivotably mounted at 119 at one of its ends to a piston rod 120 of a piston cylinder arrangement 121 and is secured at the other of its ends to the shaft 115.

Supply of compressed air to the piston cylinder arrangement 121 is effective to press the piston rod 120 out of its cylinder and to move the arm 118 in a clockwise direction (as shown in FIG. 2) about the center of the shaft 115. Since the arm 118 and also the arms 116 are rigidly secured to the shaft 115, the arms 116 also effect a clockwise movement about the center of the shaft 115. Thus, the cam faces 117 are drawn across and act upon the rollers 110 to cause the arms 109 which are in positions adjacent thereto to pivot in a counter-clockwise direction about the hinge 106 against the bias of the springs 112. Such movement of the arms 109 is effective to pivot the semi-cylindrical member 105 about the hinge 106. Consequently, the respective bar holder 103 is opened so that a length of bar stock material 122 lying against an adjustable stop face 123 in a magazine 124 can be forced between a pair of spring loaded members 125 by injector means to fall into the open bar holder 103. The bar holder 103 is provided with split nylon bushings formed by portions 126 and 127 defining between them, in the closed position of the bar holder 103, a circular section aperture of a size slidingly to receive the size of a bar stock being used.

When a signal is received from injector means that a length of bar stock has been loaded into the bar holder 103, the supply of compressed air to the piston cylinder arrangement 121 is removed and the bar holder 103 is closed by the springs 112 effecting a clockwise movement of the lever arms 109 about the hinge 106.

Figure 3:
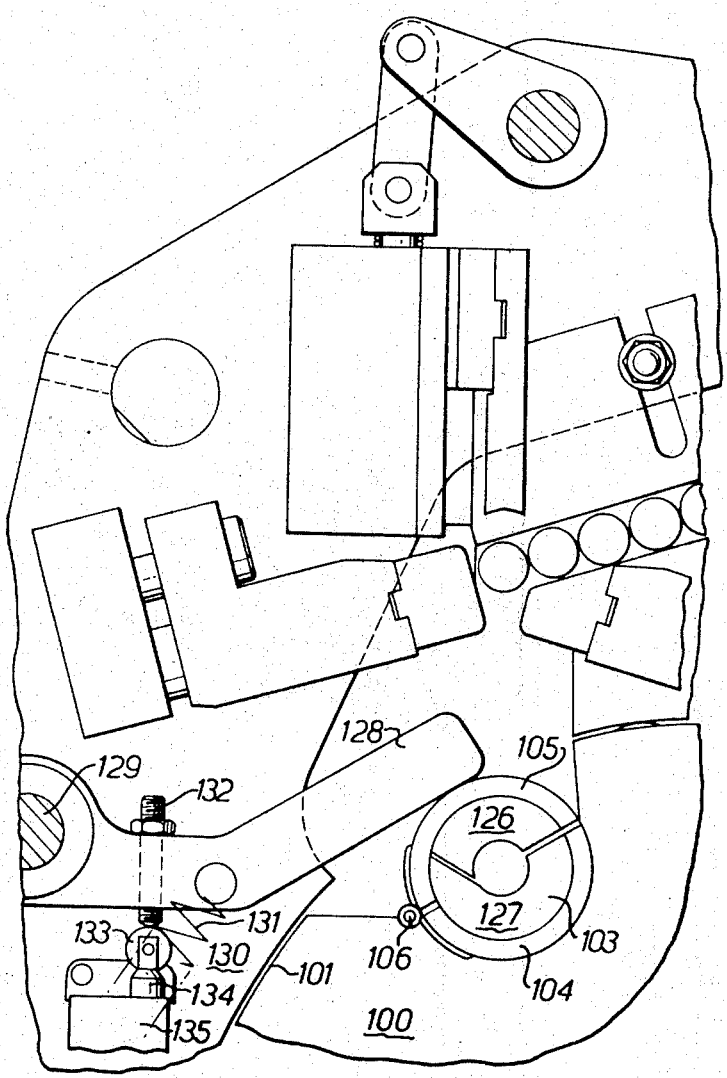
FIG. 3 is an elevation of means for ensuring that a reel of the bar holder arrangement of FIG. 2 cannot be indexed when one of the bar holders carried by the reel is in an open position.

Referring to FIG. 3, means are shown whereby further indexing of the reel 100 cannot be effected if one of the bar holders 103 thereof has not returned to a fully closed position after insertion of fresh bar stock therein. For example, the length of bar stock may not be engaged properly in the circular section aperture defined between the nylon blocks 126 and 127 and thus be trapped between side faces of the nylon blocks 126 and 127. As shown, an arm 128 is pivotaly mounted on a shaft 129 located on a static plate 130 of the framework surrounding the reel 100. The arm 128 is biased in a clockwise direction about the pivot 129 by a spring 131 and has an adjustable pin 132 therein to engage a roller 133 mounted on a plunger 134 of a switch 135 mounted on the static plate 130.

When the movable semi-cylindrical member 105 of a bar holder 103 is pivoted in a counterclockwise direction about the hinge 106 to open the bar holder 103, the arm 128 is thereby caused to pivot in a counter-clockwise direction about the shaft 129. Consequently, the end of the pin 132 is disengaged from the roller 133 thereby opening the switch 135. The switch 135, when opened, prevents indexing movement of the spindle head of the lathe and thus indexing movement of the reel 100. Thus, during the loading of a fresh length of bar stock into the bar holder 103, the reel 100 is prevented from making an indexing operation.

If the bar holder 103 is not completely closed by the springs 112 shown in FIG. 2 at the end of a loading operation of a length of bar stock into the holder 103, the arm 128 is prevented from making a sufficient movement in a clockwise direction to cuase the end of the pin 132 to engage the roller 133 and depress the plunger 134. Consequently, the switch 135 is not reclosed and further indexing movement of the reel 100 which might cause damage to the bar holder arrangement is prevented. Advantageously the switch 135 is also effective, if not closed within a determined time period, to sound an alarm. Thus, a machine operator can be summoned to clear the obstruction preventing the movable semi-cylindrical member 105 of the bar holder 103 from closing properly against the semi-cylindrical member 104.

Referring to FIGS. 4 to 8 of the drawings, a frame member 200 is formed of steel plate and is one of four such members mounted in parallel one to another and spaced four feet apart. Each of the frame members 200 has a circular aperture 201 therein. An indexable reel carries a plurality, advantageously six, of bar holders and is mounted in the aperture 201. The frame member 200 has a slot 202 at an upper position. Slot 202 is in communication with the circular aperture 201 by means of a vertically extending slot 203. A face 202a of the frame member 200 which defines the lower edge of the slot 202 forms a surface on which a plurality of lengths of bar stock material 204, of between quarter-inch and one and three-quarters inch diameter, can be stored ready to be dropped one at a time through the slot 203 into an elongated bar holder carried by the indexable reel mounted in the circular aperture 201.

At the sides of the slot 203 through which the bar stock 204 must drop to enter the elongated bar holder, guide members 301 and 360 are provided so that the width of the slot through which the bar stock material 204 can fall can be adjusted so that the bar stock 204 falls through along a determined path.

Figure 6:
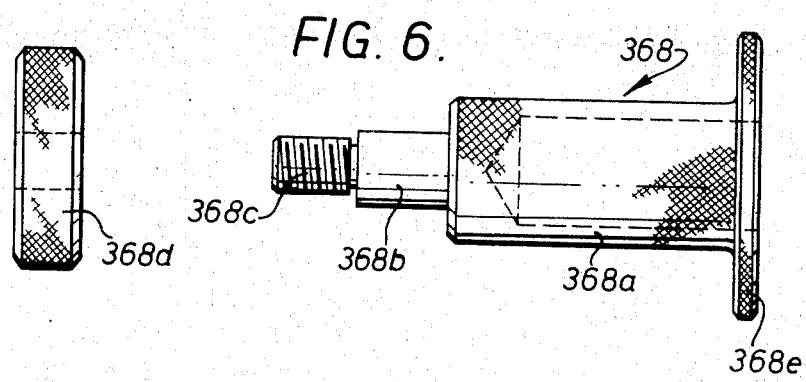
FIG. 6 shows a gauge for setting the apparatus of FIGS. 4 and 5.
Figure 7:
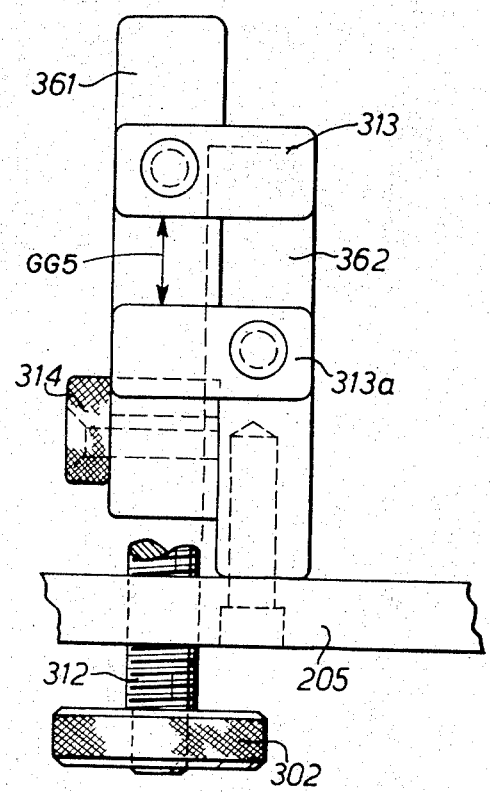
FIG. 7 is a view on arrow IV of FIG. 4.

FIG. 6 shows a gauge 368 to be used to set the guide members 301 and 360 to the correct setting apart. That is the faces 301a and 360a of the members 301 and 360, respectively, are set a distance apart slightly exceeding the diameter of the bar stock material to be used. The gauge 368 comprises a knurled handle portion 368a a securing portion 368b and a screw threaded portion 368c onto which a disc 368d which is of a thickness equal to half the diameter of the bar stock to be used can be screwed. The gauge also has a head portion 368e of one-eighth inch thickness.

Secured to each frame member 200 adjacent the outer ends of the guides 301 and 360 are gauge securing members 306 each of which has a slot 306a therein to receive the securing portions 368b of the gauge 368 and to hold the gauge 368 in position. To adjust the guides 301 and 360, respective clamping screws 301b and 360b which pass through slots in the guides 301 and 360 are loosened. The guides 301 and 360 are then moved longitudinally until outer end faces 301c and 360c respectively thereof lie against an outer face of the disc 368d of the gauge 368. At the same time the inner face of the disc 368d is lying against the gauge securing members 306. Thus gauge gaps GG1 and GG2 can readily be set, using only the gauge 368 and a spanner necessary to tighten the nuts 301b and 360b, to set the gap between the faces 301a and 360a of the guides 301 and 360 to the required dimension and in a desired position with respect to the frame member 200.

Each of the frame members 200 has a bar feed mechanism thereon at an upper position including a block 353 rigidly secured to the frame member 200. The block 353 has a vertically extending groove in its right-hand face, as viewed in FIG. 4, and a block 354 is mounted for vertical movement in the groove in the block 353. The block 354 is advantageously constrained for sliding movement in the groove in the block 353 by means of phosphor bronze plates 304 secured to the block 353 and partially over-lapping the groove therein. The block 354 is bifurcated at its upper end to receive one end of a link 310 which is pivotally connected to the block 354 by a pivot pin, the other end of the link 310 being pivotally connected to an arm 358 which is secured to a shaft 358a in a manner to prevent relative movement therebetween. The shaft 358a extends the length of the bar feeder and is coupled to each of the four arms 358 shaft 358a is rotatable in a counter-clockwise direction (as viewed in FIG. 4) by means of an arm 359 secured thereto, the other end of the arm 359 being coupled to a ram 307.

An arm 355 (FIG. 5) is secured to the upper end of the block 354 and is reciprocable in a vertical direction therewith. The end of the arm 355 remote from the frame member 200 is secured to a rightwardly extending portion of a member 351, as viewed in FIG. 4. A vertically extending portion of the member 351 has a groove in its face remote from the frame member 200, in which groove a projection of a member 356 is engageable. A bolt 356c passes through a vertically extending slot in the member 356 and clamps the member 356 to the member 351. The face of the member 356 remote from the frame member 200 has a transverse groove therein extending in a direction parallel to the face 202a of the frame member 200. A member 357 is mounted in the transverse groove in the member 356 and can be clamped therein by means of a bolt 356b which passes through a slotted aperture in the member 357, the slotted aperture extending in the same direction as the transverse groove in the member 356.

Figure 4:
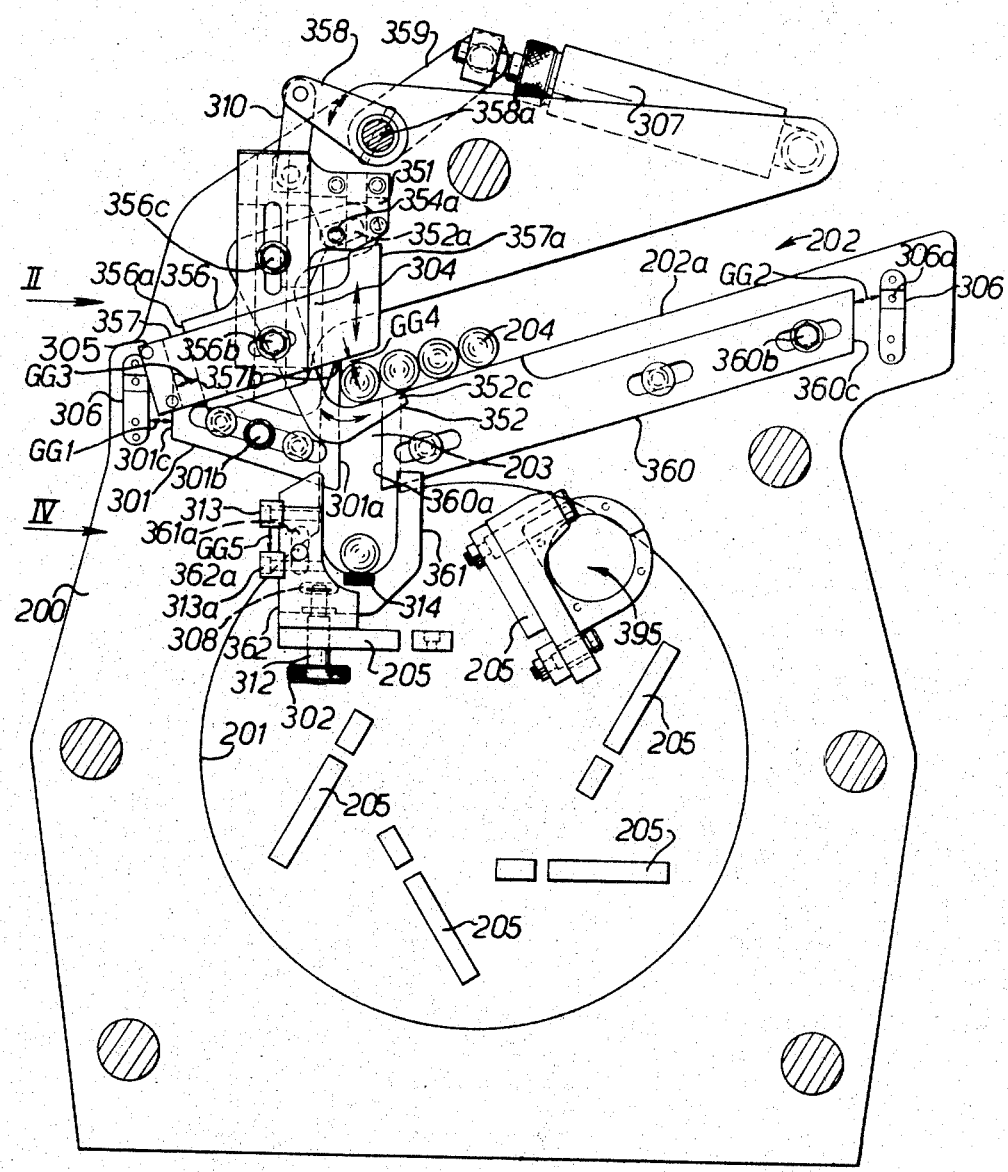
FIG. 4 is a longitudinal elevation of a second embodiment of means according to the invention.

The righthand end of the member 357 as viewed in FIG. 4 forms a face 357a which desirably lies in a vertical plane which passes as a tangent to the righthand side (as viewed in FIG. 4) of the first length of bar stock material 204 lying in the slot 202. The position of the first length of bar stock material 204 in the slot 202 is determined by the face 301a of the guide 301, against which face said length of bar stock material 204 lies.

A further gauge securing member 305 is provided on the member 357 on its face adjacent the frame member 200. A gauge 368 inserted therein will set, according to the thickness of the discs 368d used, a gauge gap GG3 between the gauge securing member 305 and an end face 356a of the member 356 thereby to position the face 357a of the member 357 in a desired position.

Figure 5:
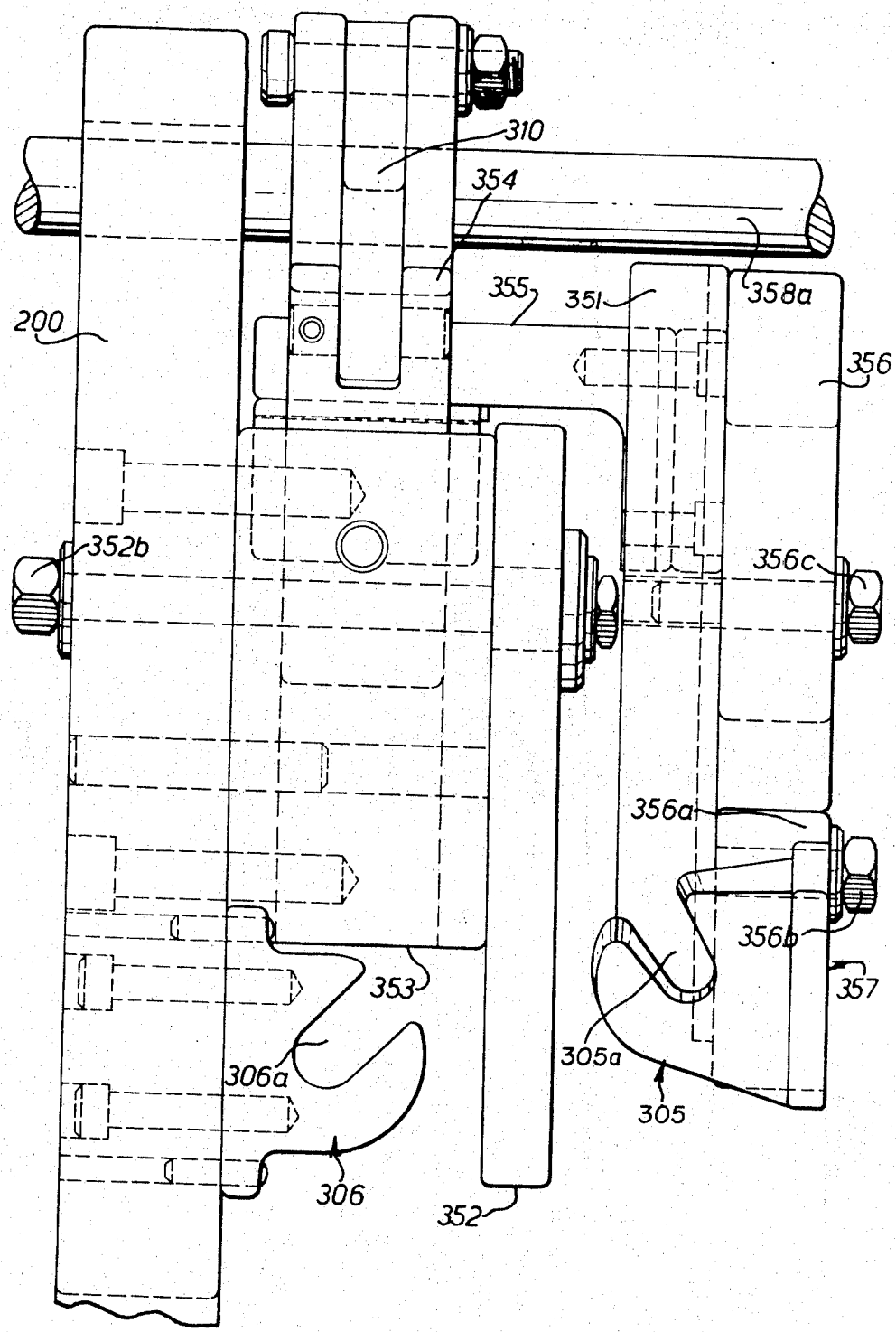
FIG. 5 is a view on arrow II of FIG. 4.

The block 354 carries a pin 354a which engages in a slot 352a of a bell crank lever 352 which is pivotally mounted for movement about an axis of a bolt 352b secured to the frame member 200 as shown in FIG. 5. A lower projecting arm 352c of the bell crank 352 passes beneath the first length of bar stock material in the slot 202 to prevent it falling through the slot 203 into the elongated bar guide of the reel supported in the circular aperture 201 of the frame member 200. By loosening the bolt 356c, the member 356, together with the member 357, can be moved with respect to the member 351 so that the face 357b of the member 357 is set one-eighth of an inch above the upper face of the first length of bar stock material in the slot 202. This dimension is set by engaging the head portion 368e of the gauge 368 between the upper faces of bar stock material 204 and the face 357b to set a gauge gap GG4.

In operation, energization of the ram 307 causes the shaft 358a to move counter-clockwise thereby causing the link 310 and the block 354 secured thereto to move downwardly a distance of about two inches. The arm 355, member 351, member 356 and member 357 move downwardly also and the pin 354a causes the bell crank lever 352 to rotate clockwise about the axis of bolt 352b to remove the retaining projection 352c of the bell crank 352 from beneath the first length of bar stock material 204 in the slot 202 and allow it to drop through the slot 203 into the elongated bar holder. The members 357 and 352 are so connected together that before the projection 352c of the bell crank 352 is moved from beneath the first length of bar stock material 204 to permit downward movement of the bar stock material, the face 357a of the member 357 has moved downwardly to a position in which it restrains the next length of bar stock material 204 in the slot 202 from moving to fill space left by the length of bar stock material which is dropping, thereby ensuring that only one length of bar stock material 204 at the time is fed to the elongated bar holder.

The reel mounted in the circular aperture 201 in the frame member 200 has six longitudinally extending members 205 therein mounting longitudinally extending bar holders 395 only one of which is shown. Secured to each of the longitudinally extending members 205 intermediate the bar holders 395 are receiving means for a length of bar stock material dropped through the slot 203. Said receiving means comprise a fixed block 362 bolted to the longitudinally extending member 205 and a vertically movable U-shaped block 361 having a nylon pad 314 secured thereto in such a manner that the nylon pad 314 forms the bottom surface of the inner face of the U-shaped member and a length of bar stock material 204 dropped through the slot 203 falls onto the nylon block 314. The blocks 361 and 362 are secured together in a manner so as to permit only relative vertical movement therebetween by means of a pin 362a secured to the fixed block 362 and engaging in a vertically extending slot 361a in the movable block 361. The movable block 361 is coupled to a screw 312 by means 308 which permit rotation of the screw 312 with respect to the movable block 361 but do not permit relative vertical movement therebetween. As shown also in FIG. 7, the shank of the screw 312 is engaged in a threaded hold in the longitudinally extending member 205 and the lower end of the screw 312 is provided with a knurled knob 302. Thus, by unclamping a connection between the movable block 361 and the fixed block 362 and rotating the knob 302, the movable block 361 can be raised or lowered to a desired extent. A block 313 is secured to the movable block 361 and a block 313a is secured to the fixed block 362 at positions such that when the disc 368d of the gauge 368 is inserted between the blocks 313 and 313a and the block 361 is moved so that the blocks 313 and 313a abut opposite sides of the disc 368, the nylon pad 314 is moved to the correct position to support a length of bar stock material dropped through the slot 203 thereonto. Consequently, the length of bar stock material 204 is in the correct position to be engaged by the bar holders 395 when they are re-closed. The distance between the pads 313 and 313a defines a gauge gap GG5.

Figure 8:
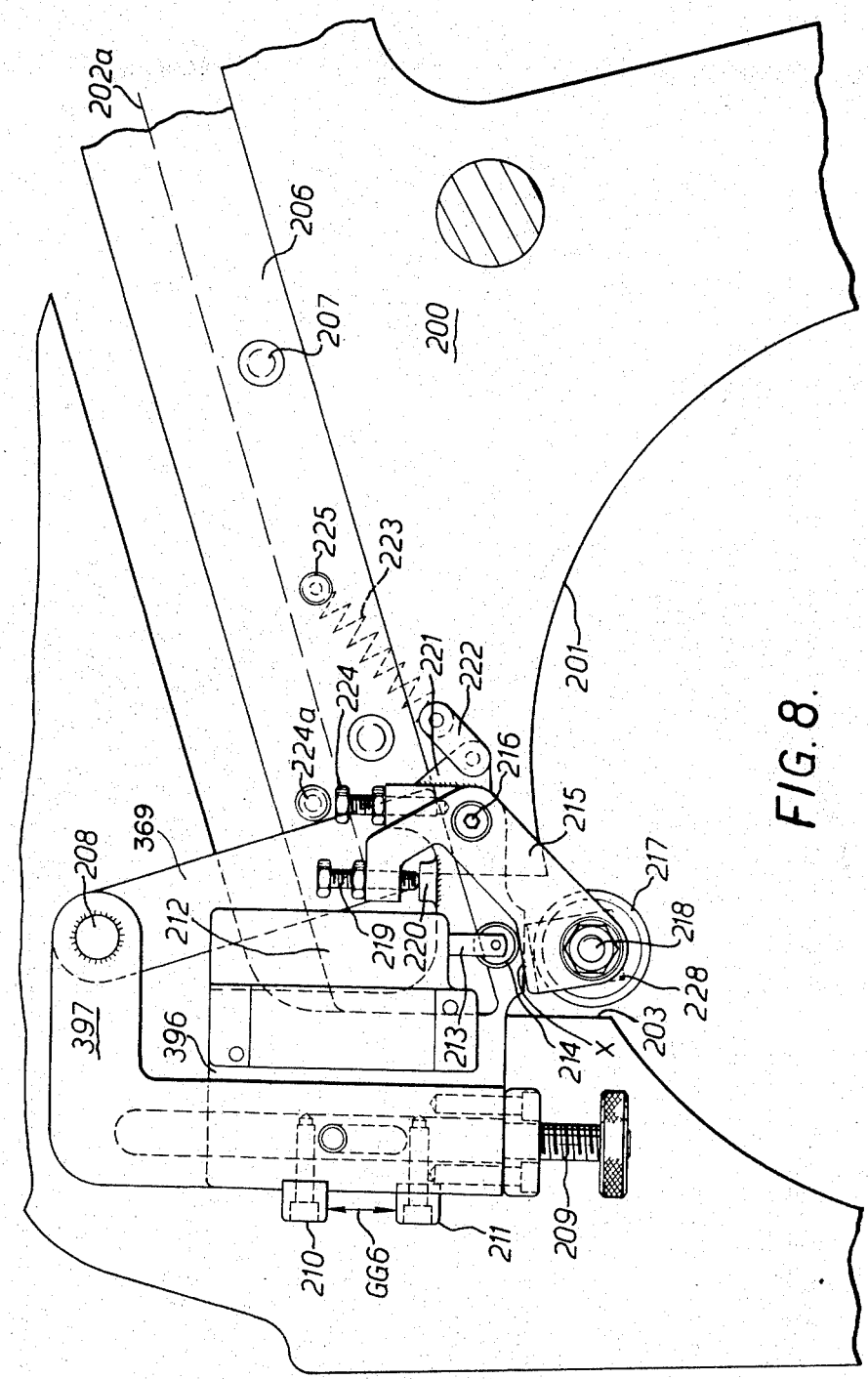
FIG. 8 is a view of a front end frame member of a bar holder arrangement viewed from the face thereof adjacent the machine tool to be fed with bar stock material.

The front end frame member 200, as shown in FIG. 8, has a stop bar 206 which projects above the level of the face 202a of the slot 202. The stop bar 206 is secured by bolts 207 in a position such that it is spaced from the frame member 200, towards the machine tool to be fed with the bar stock, advantageously by approximately nine inches. An upwardly projecting arm 369 is rigidly secured to the stop bar 206 and at its upper end bears a pin 208.

A lever 397 is pivotally mounted on the pin 208 for pivotal movement about an axis Y extending longitudinally of the bar holder. The lever 397 has a vertically extending groove in its face adjacent the frame member 200. A switch plate 396 has a projection to engage in the groove in the lever 397 whereby the switch plate 396 is vertically adjustable with respect to the lever 397 under the control of an adjusting screw 209. The adjacent respective faces of a block 210 secured to the lever 397 and a block 211 secured to the switch plate 396 defines a gauge gap GG6 therebetween which can be set by means of the block gauge of the gauge 368.

The switch plate 396 mounts a microswitch 212 having a movable stem 213 mounting a roller 214. Upward movement of the stem 213 is effective to operate the microswitch.

A lever arm 215 is pivotally mounted at a position 216 adjacent the righthand side of the switch plate 396 as viewed in FIG. 8, and supports a roller 217. The roller 217 is engaged by a length of bar stock material in a bar holder of the reel when the length of bar stock material 204 is in a position such that its forward end is further forward of the bar feeder than the rear face of the stop bar 206.

An upper face X of the lever 215 is in the same transverse vertical plane as the roller 214. Thus, if the lever 215 is rotated in a clockwise direction about its pivot 216, the face X abuts the roller 214 to raise the stem 213 and operate the microswitch 212.

A pinion 218 carries the roller 217 on the arm 215 also and a plate 228 which lies in the same transverse vertical plane as the switch plate 396. The rest position of the lever 215 with respect to the switch plate 396 is adjustable by means of a screw 219. The lower end of screw 219 engages a block 220 secured to the switch plate 396. At the extreme righthand side of the switch plate 396, a lug 221 has a link 222 coupled thereto. The other end of the link 222 being secured to a spring 223 and the other end of the spring 223 is coupled to a fixed pin 225 on the stop bar 206. An adjusting screw 224 on the switch plate 396 and a fixed pin 224a on the stop bar 206 determine the rest position of the switch plate 396. That is the position to which the lever 397 and switch plate 396 can rotate about the axis Y in a counterclockwise direction as viewed in FIG. 8 under the bias of the spring 223 is predetermined by this configuration.

In operation, the apparatus of FIG. 8 is desirably set in a position such that a length of bar stock material, in a bar holder of a reel mounted in the circular aperture 201 in the frame member 200, abuts the roller 217 when the reel is indexed. Consequently, the lever 215 is raised 1/8th of an inch to cause the face X to abut the roller 214 to move the stem 213 upwardly by an amount sufficient to operate the microswitch 212 and indicate to a control apparatus that the respective bar holder still has a length of bar therein. The forward end of the length of bar extends through a spindle of a machine tool being fed by the bar feeder. An arrangement of rollers, some of which are positioned adjacent the frame member 200 and some of which are positioned adjacent the machine tool, is used to feed the bar stock material forwardly as required by the machine. When the circumstances arise that the rear end of a length of bar stock material in a bar holder has passed forwardly of the roller 217, the microswitch 212 will not be operated when the reel is indexed so that the respective bar holder lies below the slot 203 in the frame member 200, of FIG. 8. Such failure to operate the microswitch 212 will initiate operation of the feed mechanism shown in FIGS. 4 to 7 thereby causing a further length of bar stock material to be fed into the bar holder beneath the slot 203.

Desirably, when the bar feeder is reset to feed a different diameter of bar stock material, the adjusting screw 209 is adjusted to set the gauge gap GG6 to the required dimension thereby raising or lowering the switch plate 396 together with the roller 217. Consequently, the interference between the roller 217 and a length of bar stock in a bar holder remains at only one-eighth of an inch. If, however, the operator fails to adjust the screw 209 upon changing to a larger diameter of bar stock material, damage to the apparatus shown in FIG. 8 is avoided upon interference between bar stock material and the roller 217 exceeding one-eighth of an inch by the upper face of the plate 228 abutting the adjacent lower face of the switch plate 396, after movement of the lever 215 sufficient to operate the microswitch 212. The assembly of the lever 397, switch plate 396 and lever 215 rotates in a clockwise direction about the pin 208 against the bias of the spring 223 to permit the length of bar stock material to pass beneath the roller 217. After passage of the bar stock material of a bar holder beneath the roller 217 the assembly of FIG. 8 moves back to its rest position as determined by abutment of the adjusting screw 224 and the pin 224a so that further operation of the microswitch 212 is effected upon further indexing of the reel.

Although not shown in the drawing, a further microswitch may be provided to detect movement of the lever 397 about the pin 208 beyond a determined extent, to sound an alarm and indicate to the operator that the adjusting screw 209 requires operation to reset the gauge gap GG6 to suit the new diameter of bar stock material being used.

While the bar holder arrangement of the invention has been particularly described for use with a multiple spindle automatic lathe, it should be understood that it can also be used with a single spindle automatic lathe upon suitable modifications being made or with another automatic machine tool requiring a feed of bar stock such as a centreless grinder.

Although the holder arrangement of the invention has been described for use for holding bar stock material it is of course to be understood that it is also applicable to feeding of tube stock material or material in elongated form of any other kind which is to be supplied to a machine tool for machining of workpieces and/or cutting off to required lengths.

What is claimed is:

1. In a bar holder arrangement for an automatic machine tool, the combination comprising:
   a. a magazine,
   b. an elongated bar holder and
   c. loading means for loading a length of bar stock materail from said magazine into said elongated bar holder,
   d. said loading means including a movably mounted slide member, a movably mounted retaining member, and common actuating means being coupled to said slide and retaining members for operating same,
   e. said slide member being movable toward the bar holder to apply a force to a length of bar stock material in the magazine to insert said length of bar stock material into said bar holder,
   f. said retaining member being movable between a first position in which it retains said length of bar stock material in said magazine and prevents movement of said length of bar stock material from said magazine toward said bar holder and a second position in which it does not prevent such movement,
   g. said common actuating means causing operation of said slide member and said retaining member in synchronism in a manner such that said retaining member is not moved into its second position until said slide member has moved into a position in which it is effective to prevent movement toward said bar holder from said magazine of the next length of bar stock material in the magazine.

2. The invention claimed in claim 1 including
an indexable reel,
a plurality of bar holders mounted in said indexable reel,
a framework which supports said indexable reel for rotation,
a plurality of said loading means spaced apart longitudinally along said framework,
a bottom stop provided on said reel for each of said plurality of bar holders,
each of said bottom stops being adjustable in position toward and away from the outer edge of said reel to a desired position in which a length of bar stock material dropped onto said bottom stop is at an equal radius from the center of said reel to the radius from the center of said reel of the center line of the respective bar holder.

3. The invention claimed in claim 2, wherein
said bottom stop is formed by a member of plastics material forming an inner lower surface of a U-shaped holding member,
said U-shaped holding member being adjustable in position with respect to a fixed member of said reel under the action of a screw threaded member,
projections being provided on said U-shaped holding member and said fixed member between a block gauge of a thickness appropriate with respect to the size of bar stock material to be used can be inserted such that when said projections engage with a sliding fit opposite faces of the block gauge, said plastics member is at a desired position to support a length of bar stock material dropped thereonto,
so that the length of bar stock material can be readily engaged in said bar holder and said bar holder can be closed.

4. The invention claimed in claim 1,
including an indexable reel, a plurality of bar holders mounted in said indexable reel, a framework which supports said indexable reel for rotation and a plurality of said loading means spaced apart longitudinally along said frame-work, wherein
said retaining members of each of said plurality of said loading means are each provided on a respective bell crank,
said bell cranks being pivoted on said framework and the outer end of one arm of each of said bell cranks being formed to present a slot in which a pin engages,
said pin extending from the respective slide member so that sliding movement of said slide member causes pivoting movement of said bell crank, and
a respective one of said retaining members being mounted at the outer end of the other arm of each bell crank,
each of said retaining members projecting from the respective arm in a direction approximately parallel to said one arm of the respective bell crank.

5. The invention claimed in claim 4, wherein said bell cranks are each pivoted on said framework and the outer end of one arm of each of said bell cranks is formed to present a slot in which a pin engages, said pin extending from the respective slide so that sliding movement of said slide causes pivoting movement of said bell crank.

6. The invention claimed in claim 5, wherein a respective one of said members is mounted at the outer end of the other arm of each bell crank, each of said members projecting from the respective arm in a direction approximately parallel to said one arm of the respective bell crank.

7. The invention claimed in claim 1, wherein said magazine includes a surface on which bar stock material to be fed to said bar holder can be stored and wherein
said slide member is adjustable in position both in the direction in which it is to apply said force to said length of bar stock material and in a direction parallel to said surface and where
said bar holder arrangement includes a guide means defining one side of a slot through which said bar stock material passes to enter said bar holder,
said guide means being adjustable in position to vary the width of said slot.

8. The invention claimed in claim 7, wherein
the direction of movement of said slide member is vertical and
said guide means forms a front stop against which the next length of bar stock material to be inserted into said bar holder lies,
the desired position of said guide means being spaced a distance, measured in a horizontal direction and equal to half the diameter of the bar stock material being used, away from a longitudinally extending vertical plane extending through the center line of said bar holder.

9. The invention claimed in claim 8, including a second guide means which forms the other side of said slot, said second guide means also being adjustable in position to vary the width of said slot.

10. The invention claimed in claim 9, including respective mounting members to which said slide member, and said first and second guide means, are each clampingly secured, a surface on each of said respective mounting members, a block gauge and block gauge receiving means on each of said slide members, and said first and second guide means, whereby by engaging, in said block gauge receiving means, said block gauge of an appropriate size with respect to the diameter of the bar stock material being used and moving said slide member, and said first and second guide means, to positions at which the block gauge is a sliding fit between said surface of said respective mounting member and said block gauge receiving means, said slide member, and said first and second guide means, can be readily moved to and secured in desired positions for a determined diameter of bar stock material to be used.

11. The invention claimed in claim 9, including respective mounting member to which said slide member, said first and second guide means are each clampingly secured, a block gauge and block gauge receiving means on each of said respective mounting members, whereby by engaging, in said block gauge receiving means, a block gauge of an appropriate size with respect to the diameter of the bar stock material being used and moving said slide member, and said first and second guide means, to positions at which the block gauge is a sliding fit between an end face of said slide member, and said first and second guide means, and the respective block gauge receiving means, said slide member, said first guide means and said second guide means can be readily moved to and secured in desired positions for a determined diameter of bar stock material to be used.

12. The invention claimed in claim 11, wherein said block gauge receiving means includes a slot and said block gauge comprises a cylindrical handle portion, a first extension of said cylindrical handle portion of smaller diameter to engage in said slot in said block gauge receiving means and a second extension which is screw threaded to receive a block formed as a disc of accurately determined thickness.

13. The invention claimed in claim 12 wherein the other end of the cylindrical handle portion opposed to the reduced diameter portion and the screw threaded portion is provided with a flange of greater diameter than the cylindrical handle portion, the thickness of the flange being equal to the desired spacing between the lower face of said slide member and the upper face of said length of bar stock material in said magazine, whereby insertion of said flange beneath the lower face of said slide member and adjustment of said slide member so that the flange is a sliding fit between said slide member and the length of bar stock material and adjusts said slide member to a desired position.

14. In a bar holder arrangement for an automatic machine tool, the combination comprising:

a. a magazine having a surface on which bar stock material can be stored,
b. an elongated bar holder,
c. loading means for loading a length of bar stock material from said magazine into said elongated bar holder,
d. first and second guide means defining opposing sides of a slot through which said bar stock material passes to enter the bar holder,
e. said first and second guide means being adjustable in position to vary the width of the slot,
f. said loading means including a movably mounted slide member, a movably mounted retaining member, and common actuating means for operating said slide and retaining members.
g. said slide member being vertically movable toward the bar holder to apply a force to a length of bar stock material in the magazine to insert said length of bar stock material into the bar holder,
h. said retaining member being movable between a first position in which it retains the length of bar stock material in the magazine and prevents movement of said length of bar stock material from the magazine toward the bar holder and a second position in which it does not prevent such movement,
i. said common actuating means causing operation of the slide and retaining members in synchronism in a manner such that the retaining member is not moved into its second position until the slide member has moved into a position in which it prevents movement toward the bar holder of the next length of bar stock material in the magazine,
j. said slide member being adjustable in position both in the direction in which it is to apply said force to the length of bar stock material and in a direction parallel to said magazine storing surface,
k. said first guide means forming a front stop against which the next length of bar stock material to be inserted into the bar holder lies,
l. the desired position of said first guide means being spaced a distance, measured in a horizontal direction and equal to half the diameter of the bar stock material being used, away from a longitudinally extending vertical plane extending through the center line of the bar holder,
m. respective mounting members to which said slide members and first and second guide means are each clampingly secured.
n. a block gauge including a block formed as a disc of accurately determined thickness and a cylindrical handle portion having first and second extensions, and
o. block gauge receiving means having a slot and being disposed at each of said respective mounting members,
p. said first extension having a smaller diameter effective to engage the slot in said block gauge receiving means and said second extension being screw threaded to receive said disc-shaped block,
g. whereby by engaging, in said block gauge receiving means, a block gauge of an appropriate size with respect to the diameter of the bar stock material being used and moving said slide member and said first and second guide means to positions at which the block gauge is a sliding fit between an end face of said slide member and said first and second guide means and the respective block gauge receiving means, said slide member, said first guide means and said second guide means can be readily moved to and secured in desired positions for a determined diameter of bar stock material to be used.

15. The combination as defined in claim 14 wherein the other end of the cylindrical handle portion to the reduced diameter portion and the screw threaded portion is provided with a flange of greater diameter than the cylindrical handle portion, the thickness of the flange being equal to the desired spacing between the lower face of said slide member and the upper face of said length of bar stock material in said magazine, whereby insertion of said flange beneath the lower face of said slide member and adjustment of said slide member so that the flange is a sliding fit between said slide member and the length of bar stock material and adjusts said slide member to a desired position.

\* \* \* \* \*